Jan. 25, 1927.
G. S. FULCHER
1,615,750

CAST REFRACTORY ARTICLE AND METHOD OF MAKING THE SAME

Filed July 31, 1925          2 Sheets-Sheet 1

INVENTOR
Gordon S. Fulcher.
BY
ATTORNEY

Jan. 25, 1927.

G. S. FULCHER 1,615,750

CAST REFRACTORY ARTICLE AND METHOD OF MAKING THE SAME

Filed July 31. 1925     2 Sheets-Sheet 2

INVENTOR

Gordon S. Fulcher:

BY

ATTORNEY

Patented Jan. 25, 1927.

1,615,750

UNITED STATES PATENT OFFICE.

GORDON S. FULCHER, OF CORNING, NEW YORK, ASSIGNOR TO CORNING GLASS WORKS, OF CORNING, NEW YORK, A CORPORATION OF NEW YORK.

CAST REFRACTORY ARTICLE AND METHOD OF MAKING THE SAME.

Application filed July 31, 1925. Serial No. 47,381.

This invention relates to the art of refractory materials, and more particularly to refractory articles adapted to resist the corroding action of molten glass, molten slag and other corrosive liquids, and of corrosive gases.

It is an object of this invention to provide new refractory articles which are non-porous and crystalline and are more dense, stronger at high temperatures, and more resistant to corrosive action than other refractory articles now in use.

It is a further object to provide a new method of producing refractory articles.

It is a still further object to provide a method of securing cast refractory articles which are sound and free from cracks.

It is also an object to provide a method of making refractory articles without the use of a binder for the refractory material which forms the article.

In order to make clear the relation of my new refractory articles to those in use at present, I shall classify refractory articles, according to their method of manufacture, into three general groups, as follows:

(1) Natural refractory articles, which are made of natural clays or other materials. This group includes all clay refractories, porcelain, and articles made of such natural materials as bauxite, diaspore, magnesia, lime, dolomite, chromite, zirkite, and andalusite.

(2) Artificial refractory articles, which are made partly or wholly of material formed by fusion or crystallization in an electric or other furnace. This artificially formed material is obtained in a mass which must be broken up and ground to a more or less fine mesh before it is ready for use as a constituent of a refractory article. This group includes articles containing such artificial materials as fused alumina, magnesia, mullite (aluminum silicate), and magnesium aluminate, and also carborundum.

Articles of both of these groups are formed by molding more or less plastic material into the shape of the article desired, drying, and sintering or burning. The second group is distinguished from the first by the inclusion of the preliminary additional process of fusion or crystallization. Articles of the second group are more expensive but may be superior to the corresponding natural refractory articles because they may differ therefrom in chemical composition, purity, crystal structure and density.

(3) Cast refractory articles, formed, as described in this application, by fusing the desired constituents, preferably in an electric furnace, pouring the molten material into a mold having the form of the desired article, and then cooling the casting in such a way as to prevent it from cracking. In this way the grinding, molding and sintering operations required for the articles of the second group are avoided and articles of the desired shape and composition are obtained directly and quickly. Moreover, the cast material is superior in resistance to corrosion because of its non-porosity, its greater density and its crystal structure. Furthermore, in the case of a sintered article the final resistance of the material, both to corrosion and fracture, is the resistance of the bond, which from necessity is a relatively soluble and fracturable material. This weak bonding agent is eliminated in a cast article. In fact, cast refractory articles are so hard that they cannot be chipped or otherwise appreciably changed in shape after being cast, except by grinding, which is slow and expensive, hence they should be cast directly into the form of the article desired.

Although refractory articles of the type indicated in the second group are being made on a large commercial scale, so far as I know no one has hitherto succeeded in making sound castings of refractory material, i. e. castings which are free from cracks. I have discovered the conditions necessary for producing sound castings and disclose them in the following specification, taken in connection with the accompanying drawings, in which.

Figure 1:
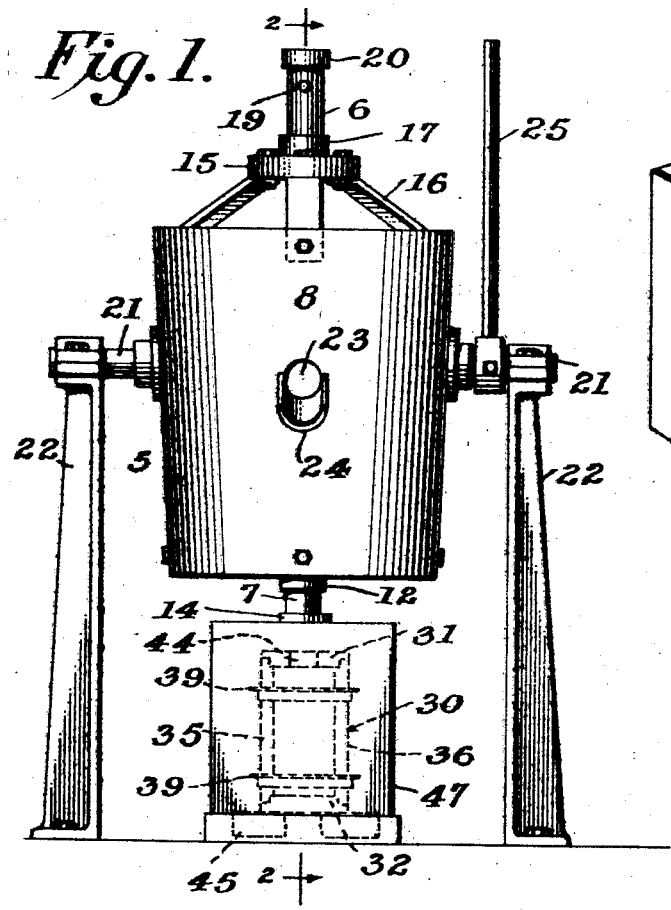
Fig. 1 is an elevation of an electric arc furnace and related mold equipment adapted for use in carrying out my invention.
Figure 4:
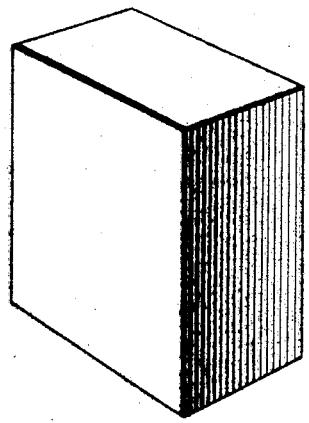
Figs. 4 and 5 are perspective views of a tank block and crucible, respectively, made in accordance with my invention.
Figure 5:
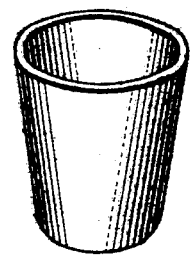
Figure 2:
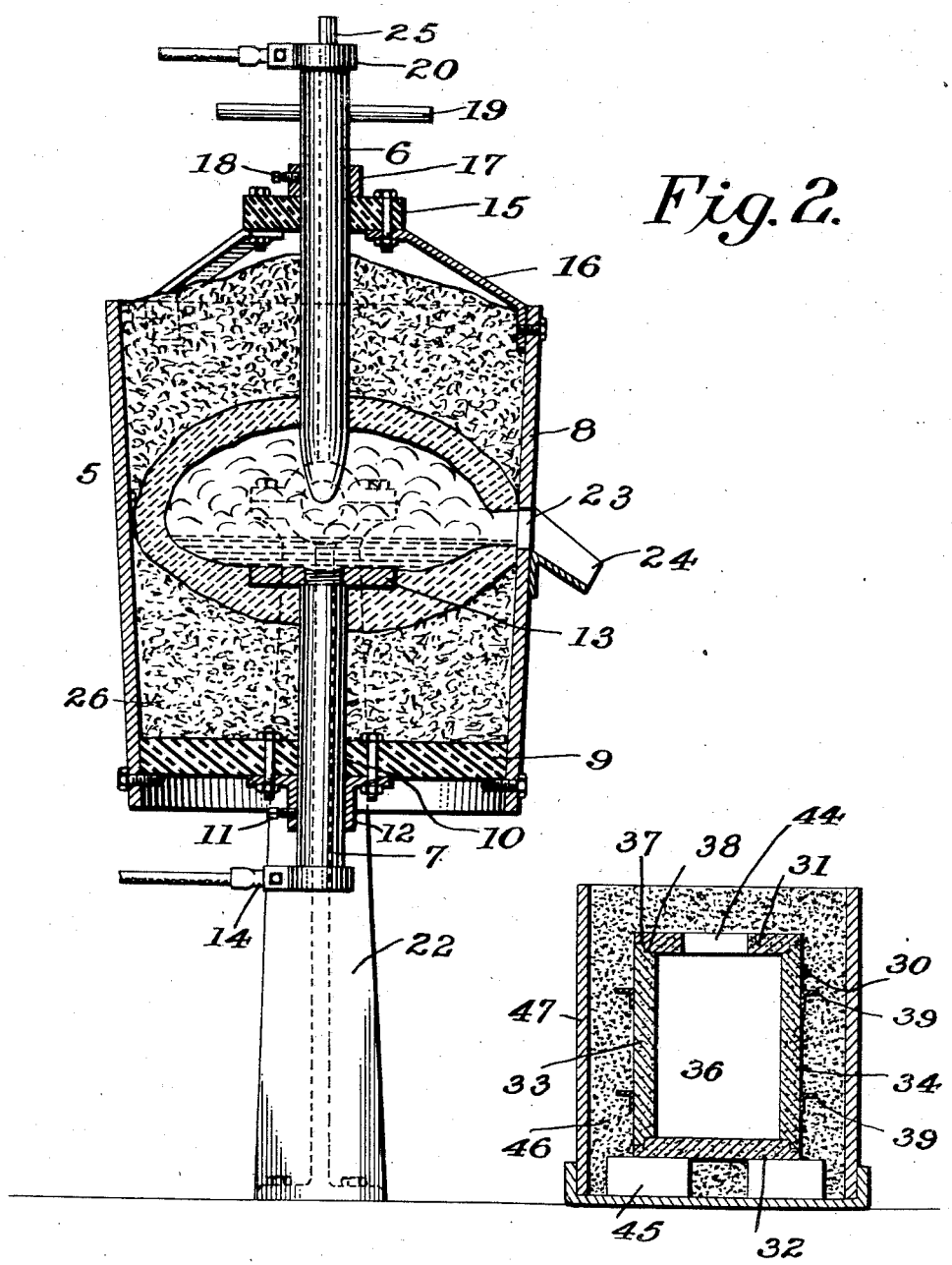
Fig. 2 is a vertical transverse section, on an enlarged scale, taken on the line 2—2 of Fig. 1.

Referring to the accompanying drawings, and particularly to Figs. 1 and 2 thereof, I have therein disclosed a suitable furnace 5 for use in carrying out my invention, this furnace being designed for melting any suitable materials for making refractories such as mullite, for instance a mixture of clays or a mixture of clay and sand, and for pouring the molten liquid into a mold so that it may be given the form of the article it is desired to produce.

Although various types of furnaces may be used, I have shown herein an electric furnace which is so constructed that an arc may be produced between two vertically disposed electrodes 6 and 7. A shell 8, which is open at its top, and which is closed at its bottom by means of a disk 9, surrounds the electrodes 6 and 7, the electrode 6 projecting into the shell from the top thereof, while the electrode 7 projects into the shell from the bottom thereof. The electrodes can be made of either graphite or carbon, and the disk 9 is preferably formed from suitable insulating material, such as transite.

The electrode 7 is passed upwardly through an opening 10, formed in the disk 9, and is retained in position by any suitable means, such as a setscrew 11, passed through a collar 12 fixed to the bottom of the disk 9. A graphite plate 13 is fixed to the top of electrode 7, after the electrode has been positioned in the furnace, and this plate forms the bottom of the part of the furnace in which the molten material is contained, as will hereinafter be more fully described. Fastened to the lower extremity of the electrode 7 is an electrical conductor 14 by which current, and preferably alternating current, is supplied to it from any suitable source.

The upper electrode 6 is carried by disk 15, which is preferably formed from suitable insulating material, such as transite, and is supported above the open top of the shell 8 by a plurality of arms 16. Resting upon the upper surface of the disk 15, and surrounding the electrode 6, is a collar 17, through which passes a setscrew 18 for adjusting the position of electrode 6 with respect to electrode 7. A rod 19 is passed through the electrode 6, near its upper end, to serve as a handle for manipulating it. Fastened to the upper extremity of the electrode 6 is an electrical conductor 20 by which the current is supplied to it.

The shell 8 is preferably made with walls which taper inwardly from top to bottom, so that material can be readily charged and discharged therefrom. It is also provided with a pair of trunnions 21 which are revolubly mounted, in bearings carried by a suitable frame 22, so that the furnace may be tilted to pour the liquid into any desired mold. For this purpose the shell 8 is provided with an aperture 23, near the middle of the side wall, and just below this aperture a spout 24 is rigidly secured to the shell. A handle 25 facilitates tilting.

In assembling the furnace, the disk 9 and the electrode 7 are put in place, and the shell is filled to the top of the lower electrode with pieces of crushed refractory-forming material 26. Small pieces of coke are placed on the electrode 7, and then the upper electrode 6 is lowered until the contact is made.

After the arc has been started the material that is to be melted is fed in and falls around the arc until the furnace is filled, as shown in Fig. 2. This material is preferably in granular form, and should not contain too much dust. To prevent the material flowing out of the aperture 23, the latter is temporarily closed with clay or other material. A few minutes after the arc has been started it may be desirable to raise the electrode 6, so as to increase the power input. When a cavity is formed around the arc, due to melting of the material, it is desirable to poke down the batch from time to time, to increase the quantity of liquid. During the melting the cavity increases in size until it approaches the shell of the furnace close enough to make it red hot in places. It is then time to make an opening through the aperture 23 into the cavity containing the liquid, and pour the liquid into the mold. Fig. 2 shows the furnace ready for pouring.

Among the articles I have successfully produced by the method indicated herein, using 30 kw. and 100 kw. furnaces, are tank blocks 12" x 18" x 8"; bricks 2" x 4" x 9"; slabs 3" x 12" x 18"; pipes 4" inside diameter, 6" outside diameter and 12" long; bowls and needles for use in automatic glass feeders; and crucibles from 6" maximum diameter and 3/8" thick to 1¼" diameter and 1/8" thick.

I have found that the kind of mold used, the length of time the article is left in the mold, and the subsequent heat treatment if it is removed from the mold, have a decided effect on the physical properties of the product, and that molds which are suitable for forming some refractory articles are not suitable for forming other articles. The various types of molds will be discussed fully below.

Generally speaking, I have found that iron molds are unsatisfactory except for small or relatively thin castings, like crucibles and glass feeder parts. For forming such articles I have found that the casting must be removed from the mold as soon as the surface has set sufficiently to permit the casting to be handled, whereupon the latter must be treated as indicated below.

I have found the most satisfactory mold for most purposes, and particularly for tank blocks and bricks, to be one made out of glass sand and a suitable bonding material, such as linseed oil, and baked. Such sand molds, in addition to possessing the other advantages indicated herein, will not flux with the casting.

Figure 3:
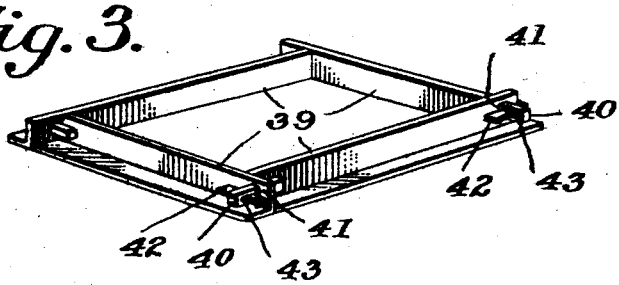
Fig. 3 is an inverted perspective view of the frame used for holding the parts of my preferred tank block mold together.

Such a mold, particularly adapted for forming a rectangular block having a volume of one cubic foot, is indicated at 30 in Figs. 1—2. It consists of six flat pieces 31, 32, 33, 34, 35, and 36, each one inch thick, formed with mating projections 37 and recesses 38 around their edges to assist in fitting them together. These mold pieces are preferably held together by a frame composed of angle irons 39, whose adjacent ends are secured together in any suitable manner. As shown in Fig. 3, a lug 40 is welded onto the end of each angle iron 39 and this lug is inserted through a perforation 41 in the opposite end of the adjacent angle iron, a wedge 42 being driven into a perforation 43, in the end of each lug 40 which passes through a perforation 41, to hold the angle irons in position. The top piece 31 of the mold is provided with an opening 44 through which the molten material is poured into the mold when the furnace is tilted, and the mold is preferably painted with graphite to prevent adhesion of the sand to the casting.

In making larger or smaller articles the mold may be made thicker or thinner in proportion to the linear dimension of the article to be made.

The baked sand mold is preferably placed on sil-o-cel brick 45 and insulated on all sides, top and bottom, with three or four inches of sil-o-cel powder 46, confined in a container 47 of sheet iron or other suitable material.

In selecting the proper mold and method of heat treatment I have been guided by the following considerations.

I have discovered that in order to obtain sound castings of refractory material it is essential to cool them slowly, particularly through the setting range of temperature, i. e. the temperature range in which they are changing from a semi-plastic to a rigid condition. By this treatment any strains introduced during pouring and the initial contact with the mold will be relieved and any strains introduced during the slow cooling, due to temperature gradients, will not be sufficient to produce checks.

If the castings are left in an iron mold the surfaces cool rapidly and become rigid while the inside is still plastic so that by the time the inside is rigid the outside is hundreds of degrees colder. Consequently, in cooling to room temperature, the inside must contract more than the outside, putting the surface under tension so that it cracks. If, however, the casting is cooled slowly so that there is but little temperature difference between the inside and the outside, while it is becoming rigid, such stresses will not occur and a solid casting will be obtained. The setting temperature varies with the composition of the refractory and must be found by experiment in each case, but for the alminous-silicious refractories indicated below I have found that it starts in the vicinity of 1550° C.

By analogy to the similar process used to prevent breakage of glass, I will call my new process of treating castings, to prevent their cracking, annealing. It should be understood, however, that the purpose of this annealing is to eliminate excessive internal stresses, and not to change the crystal formation as in the process of annealing metal castings.

I have successfully used the three following methods of annealing cast refractory articles:

1. *Annealing in a kiln.*—The casting is left in the mold only long enough for the surface to set sufficiently to permit handling, and is then transferred rapidly to a kiln already heated to a temperature at or near the annealing temperature of the material. After a sufficient number of castings has been put in the kiln, the temperature is held at the annealing point for a few hours and then is lowered slowly to room temperature, the allowable rate depending on the thickness of the castings. For one inch castings, 24 hours is usually sufficient. This method of annealing is expensive but is the only method I have found successful with small or relatively thin castings like crucibles and feeder parts. With this method iron open and shut molds may be used, provided the casting is taken out before it has chilled too much.

2. *Annealing in heat insulating powder, such as sil-o-cel.*—Relatively heavy articles like tank blocks may be annealed by transferring them, as soon as their outer surface has set sufficiently to permit handling, from the mold, which may be of glass sand and linseed oil, to a can containing insulating powder; or, after removing the mold, a can may be placed around the casting and the space between the casting and the can filled with insulating powder. In the latter case the bottom of the mold is not removed, but if the mold is placed on insulating brick this is not necessary. If the block weighs in the vicinity of 200 lbs. the heat content of the block may be sufficient to reheat the surface, after chilling by the mold and by exposure to the air, to above the annealing temperature. Then, owing to the insulation, the whole block will cool slowly through the annealing temperature down to room temperature. The objection to this method is that the process of removing the mold and adding the powder is disagreeable, and this method is not as effective as the third method.

3. *Annealing in a thin walled insulated mold.*—If the casting is fairly large then it is best to use a thin walled, well insulated, sand mold, such as that described above. The walls must be rigid enough to hold their shape while the liquid is setting and until it is hard, but they must not take too much heat out of the casting or else the rate of cooling will be too fast. If the walls are thin enough the heat capacity of the mold will be so small with reference to that of the casting that the inner surface of the mold will become heated to the annealing point before the casting has cooled below the annealing point and, because of the insulation, the casting will then anneal itself as it slowly cools. After the casting is poured, sil-o-cel powder is shovelled on top of the mold, and in about half an hour the exterior of the casting will have set, although the interior may still be liquid, and the mold will have largely disintegrated owing to the burning out of the binder. The angle iron supports, which are thus released, are then removed with iron hooks (not shown) so that they may be used again. Except for the removal of the angle irons, the casting is not touched until it is cool, which, for a tank block 12" x 18" x 8" and weighing approximately 175 lbs., will take about 4 days when insulated with sil-o-cel powder. It is then removed from the insulating material and is ready for use. In the same way large castings of various shapes may be made, but in the case of irregular articles like feeder bowls, where the thickness is less than about 2 inches, it is hardly practical to use this method and annealing in a kiln must be resorted to.

The heavier the casting, in general, the easier it is to anneal, unless it has thin sections, but by annealing in a kiln sound castings as thin as 1/8" have been obtained.

In making thin hollow articles, like crucibles or tubes, I prefer to use an iron open and shut mold of the proper shape to form the outside of the desired article. After filling this mold with liquid refractory, and letting it set until the desired wall thickness has been secured, the remaining liquid is poured out, whereupon the article is removed from the mold as quickly as possible and placed in a kiln.

It should be clearly understood that the casting process of producing refractories is not only more direct and cheaper than the process which involves crushing and grinding the ingot, mixing the batch, shaping and sintering or burning the article (articles of the second group), but the cast material is also different in its physical properties and structure. Its crystals are larger and more closely packed than in refractory material which is made of fragments of broken crystals, even though these are afterwards heated to near the fusion point so that recrystallization takes place. The cast material in which the crystals are indigenous, that is, have grown in situ from a fusion, is necessarily denser and freer from pores. The cast material is non-porous; and while it is possible to vitrify porcelain and similar refractories by heating them until the particles flux together, porosity can be prevented only by using finely ground materials, thus sacrificing strength and resistance to heat shock. Such vitrified articles are expensive and fragile, show much finer crystals, and are less dense than cast refractory articles. Also, cast refractory articles are much stronger at high temperatures than prior refractory articles of similar composition, the softening temperature, or temperature at which they yield appreciably to a given load, being considerably higher. Furthermore, the resistance of cast refractory articles to corrosion by molten glass and other materials is also considerably greater than that of prior refractory articles.

My experiments have been performed largely with aluminous-silicious refractories containing from 65 to 80 per cent $Al_2O_3$, and with refractories consisting chiefly of alumina and silica (with from 20 to 40% silica), or of alumina, silica and zirconia (with up to 30% zirconia), but the methods I have used to make sound castings of these materials can readily be used to obtain sound castings of any refractory material that can be melted and tapped from an electric furnace, including more or less pure alumina, magnesia, and zirconia, and mixtures of these with each other and with silica and other oxides.

If raw materials composed chiefly of alumina and silica, such as diaspore and kaolin, are utilized as the refractory-making materials, and these materials are melted together and formed into refractory articles in accordance with the method indicated herein, the resulting product will consist of mullite and corundum crystals embedded in a glassy matrix, and if other raw materials, such as those named above, are employed, crystals of compounds corresponding thereto will be produced, but in all cases the product according to this application will consist of crystals which may vary in size from micro-crystals up, embedded in a glassy matrix; hence the material is crystalline as the term is here used.

In the case of materials with an annealing point so high that a sand mold cannot be used, the mold can be made of fused refractory material which has equal or higher melting point than the refractory to be cast, this material being crushed to about 20 mesh or finer and bonded with linseed oil or other organic binder.

It will therefore be apparent that I have not only invented new and improved refractory articles possessing important advantages not heretofore attained by other refractory articles, but that I have also invented a new process of producing refractory articles which is simpler, cheaper and more efficient than the methods heretofore in use. Although I have herein indicated certain materials, apparatus and temperatures which I have found satisfactory, I do not desire to be limited to these, since my method is susceptible of various modifications in the production of improved refractory articles, within the scope of the following claims.

The word "casting" in the following claims is used to define an article which has been cast or formed by running molten material of the character called for into a mold of any desired form.

The terms "refractory material", "refractory article" or "refractory casting" are used to designate a material, article or casting which, when used in a furnace at high temperatures, will for a prolonged period successfully withstand the temperature encountered and will resist the abrasion and corrosion at the places where used.

In my other application, filed May 26th 1923, Ser. No. 641,753, I am claiming a cast refractory containing zirconia, and in my other application, filed July 27, 1926, I am claiming an annealed cast refractory containing zirconia, and hence no claim specific to either is made in this application.

I claim:

1. An annealed refractory casting, composed of compact, indigenous crystalline material.

2. A refractory article consisting of an annealed casting composed of indigenously crystalline material.

3. A method of producing non-porous refractory crystalline casting which comprises fusing the ingredients of a non-vitreous refractory material, pouring the molten material into a mold, and annealing the crystalline casting thus formed by cooling it slowly while it is solidifying from the semiplastic condition.

4. A method of producing non-porous refractory articles which comprises fusing the ingredients of a refractory material in an electric furnace, pouring the molten material into a mold, removing the article from the mold as soon as its outer surface has set sufficiently to permit handling, and annealing the article.

5. A method of producing non-porous refractory articles which comprises fusing the material in an electric furnace, pouring the material into a relatively thin mold which will not flux with the casting, surrounding the mold with an insulating material, and allowing the article to remain in the mold and cool slowly therein.

6. A method of producing non-porous refractory articles which comprises fusing the material, pouring the molten material into a mold made of pure glass sand suitably bonded, and annealing the article.

7. A method of producing non-porous refractory articles which comprises fusing the material in an electric furnace, pouring the molten material into a mold made of pure glass sand suitably bonded, and annealing the article.

8. A method of producing non-porous refractory articles which comprises fusing the material in an electric furnace, pouring the molten material into a mold made of pure glass sand suitably bonded, and annealing the article by allowing it to cool slowly through its setting range of temperature in a mass of insulating material in which the mold is embedded.

9. A method of producing non-porous refractory articles which comprises fusing the material in an electric furnace, pouring the molten material into a mold made of pure glass sand suitably bonded, surrounding the mold with an insulating material, allowing the mold to partially disintegrate before the interior of the article has set, and slowly annealing the article thereafter without removing it from the insulating material.

10. A method of producing non-porous refractory articles which comprises fusing the material in an electric furnace, pouring the molten material into a mold made of crushed refractory material which has equal or higher melting point than the refractory to be cast, and which has been suitably bonded, and annealing the article.

11. A method of producing refractory articles composed of mullite and corundum crystals embedded in a glassy matrix, which comprises fusing aluminous-silicious materials in an electric furnace, pouring the molten material into a glass sand mold, and slowly annealing the article thus formed.

12. An annealed refractory casting composed of mullite and corundum crystals embedded in a glassy matrix.

13. A method of producing thin walled hollow refractory articles, which comprises fusing the material in an electric furnace, pouring the molten material into a mold of the proper shape to form the outside of the desired article, allowing it to set until the desired wall thickness has been secured, pouring out the remaining liquid, removing the article from the mold, and annealing it in a kiln.

GORDON S. FULCHER.